(12) United States Patent
Ishii et al.

(10) Patent No.: US 9,649,892 B2
(45) Date of Patent: May 16, 2017

(54) WHEEL FOR VEHICLE

(71) Applicant: HONDA MOTOR CO., LTD., Minato-Ku, Tokyo (JP)

(72) Inventors: Katsushi Ishii, Wako (JP); Atsushi Ishizuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/892,274

(22) PCT Filed: Apr. 14, 2014

(86) PCT No.: PCT/JP2014/060581
§ 371 (c)(1),
(2) Date: Nov. 19, 2015

(87) PCT Pub. No.: WO2014/188815
PCT Pub. Date: Nov. 27, 2014

(65) Prior Publication Data
US 2016/0082769 A1    Mar. 24, 2016

(30) Foreign Application Priority Data

May 21, 2013   (JP) .................................. 2013-106925

(51) Int. Cl.
*B60C 19/00*    (2006.01)
*B60B 21/02*    (2006.01)
(Continued)

(52) U.S. Cl.
CPC .......... *B60C 19/002* (2013.04); *B60B 21/026* (2013.01); *B60B 21/12* (2013.01); *B60B 2900/133* (2013.01); *G10K 11/172* (2013.01)

(58) Field of Classification Search
CPC ..... B60C 19/002; B60B 21/12; B60B 21/026; B60B 2900/131; B60B 2900/133; B60B 25/22
See application file for complete search history.

(56) References Cited

U.S. PATENT DOCUMENTS 7,690,410 B2    4/2010 Kamiyama et al.
2008/0277997 A1* 11/2008 Kamiyama ............ B60B 3/044
                                                         301/95.101
(Continued)

FOREIGN PATENT DOCUMENTS

CN    101423005 A    5/2009
CN    102009564 A    4/2011
(Continued)

OTHER PUBLICATIONS

Office Action dated Aug. 12, 2016 for corresponding Chinese Patent Application 201480027200.4.

*Primary Examiner* — Kip T Kotter
(74) *Attorney, Agent, or Firm* — Carrier Blackman & Associates, P.C.; William D. Blackman; Jingli Wang

(57) ABSTRACT

A wheel for a vehicle includes an additional air chamber member (10) having: a main body (13) which is fitted between a first vertical wall surface (16a) and a second vertical wall surface (16b); a first edge portion (14a) which extends from the main body (13) toward the first vertical wall surface (16a); a second edge portion (14b) which extends from the main body (13) toward the second vertical wall surface (16b); and a protruding portion (26) which protrudes from the first edge portion (14a) in the radial direction (Z) of the wheel so as to be fixedly engaged with the first vertical wall surface (16a).

6 Claims, 11 Drawing Sheets

(51) Int. Cl.
 *B60B 21/12* (2006.01)
 *G10K 11/172* (2006.01)

(56) References Cited

U.S. PATENT DOCUMENTS

| | | | |
|---|---|---|---|
| 2009/0072611 A1* | 3/2009 | Kashiwai | B60C 23/0494 |
| | | | 301/5.21 |
| 2009/0108666 A1 | 4/2009 | Kashiwai et al. | |
| 2010/0090520 A1* | 4/2010 | Kamiyama | B60B 1/08 |
| | | | 301/95.104 |
| 2011/0057505 A1 | 3/2011 | Nagata et al. | |
| 2014/0300177 A1 | 10/2014 | Rathje et al. | |
| 2016/0001596 A1* | 1/2016 | Kamiyama | B60B 21/02 |
| | | | 301/95.104 |

FOREIGN PATENT DOCUMENTS

| | | |
|---|---|---|
| JP | 2008-120222 A | 5/2008 |
| JP | 2008-143285 A | 6/2008 |
| JP | 2008-279911 A | 11/2008 |
| JP | 2010-052700 A | 3/2010 |
| JP | 2010-095147 A | 4/2010 |
| JP | 4551422 B2 | 9/2010 |
| JP | 2012045971 A | 3/2012 |
| JP | 2012051397 A | 3/2012 |
| WO | 2013/053436 A1 | 4/2013 |

* cited by examiner

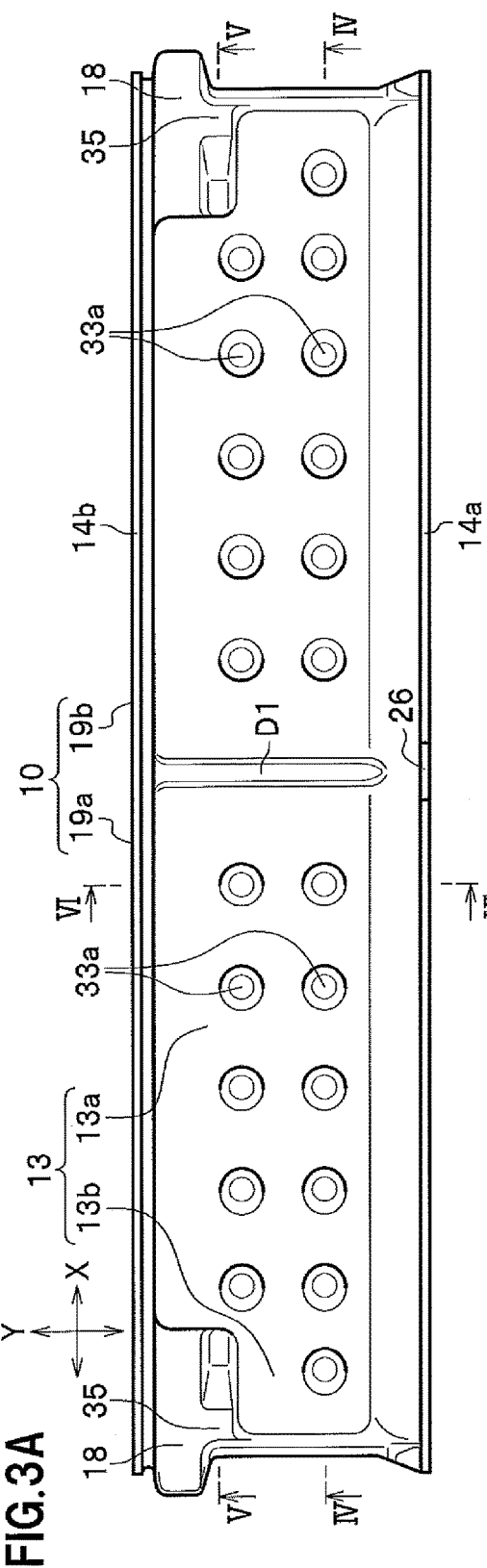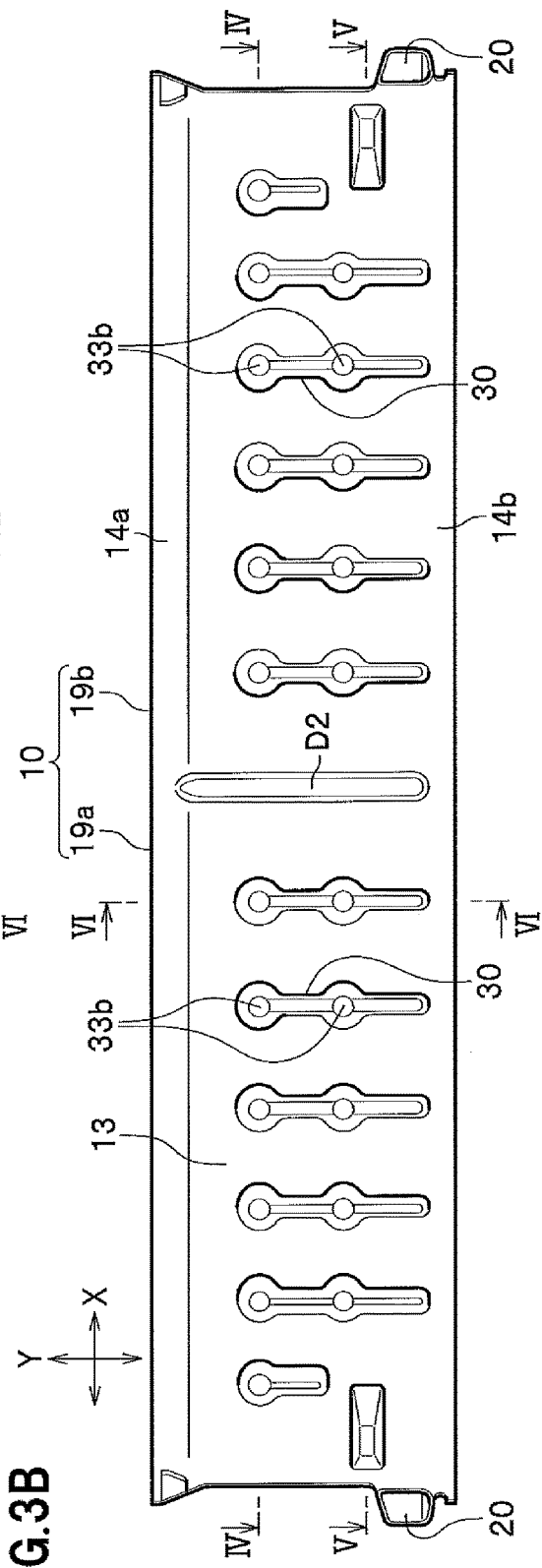

WHEEL FOR VEHICLE

TECHNICAL FIELD

The present invention relates to a wheel for a vehicle.

BACKGROUND ART

As a conventional wheel which reduces a road noise due to an air column resonance inside a tire air chamber, a wheel for a vehicle having already been disclosed by the present applicant is known in which an additional air chamber member functioning as a Helmholtz resonator in a tire air chamber is fixed to an outer circumferential surface of a well portion (for example, see Patent Literature 1).

This wheel includes a first vertical wall surface which is formed to extend in a circumferential direction of the outer circumferential surface on a vertical wall vertically provided on the outer circumferential surface of the well portion, and a second vertical wall surface which is formed to extend in the circumferential direction on a rising portion formed at one end of the well portion and faces the first vertical wall surface in a width direction of the outer circumferential surface. Moreover, a groove is formed to extend in the circumferential direction on the first vertical wall surface and the second vertical wall surface, respectively, and the additional air chamber member is fitted between the first vertical wall surface and the second vertical wall surface.

Also, the additional air chamber member includes a main body made of resin which is composed of an additional air chamber and a communication hole communicating the additional air chamber with the tire air chamber. Moreover, the additional air chamber member includes a first edge portion which is formed to extend from the main body toward the first vertical wall surface and to extend in the circumferential direction, so as to be fixedly engaged with the groove on the first vertical wall surface. In addition, the additional air chamber member includes a second edge portion which is formed to extend from the main body toward the second vertical wall surface and to extend in the circumferential direction, so as to be fixedly engaged with the groove on the second vertical wall surface.

Furthermore, the additional air chamber member includes a protruding portion serving as a so-called rotation-stop, which protrudes from the edge portion in a wheel width direction to be fixedly engaged with the vertical wall surface, so as to restrict movement of the additional air chamber member to a wheel circumferential direction.

The additional air chamber member of the vehicle wheel thus configured (for example, see Patent Literature 1) is often fixed to the well portion with a predetermined pusher (pressing device). FIG. 11A to be next referred to is a perspective view for explaining a mounting method by which an additional air chamber member 110 in a conventional vehicle wheel is mounted on a well portion 11c. As shown in FIG. 11A, the mounting method of the conventional additional air chamber member 110 includes inclining the additional air chamber member 110 so as to allow an edge portion 114a of the additional air chamber member 110 to come close to the well portion 11c and then allowing a protruding portion 118 provided on the edge portion 114a to be fitted in a cut-out portion 120 formed on the well portion 11c. At the same time, a portion of the edge portion 114a in the vicinity of the protruding portion 118 is fitted in a groove (not shown) on a first vertical wall surface 116a.

Then, a pusher 60 is pressed against an edge portion 114b of the additional air chamber member 110, thereby allowing the entire edge portion 114a to be fitted in the groove on the first vertical wall surface 116a and allowing the entire edge portion 114b to be fitted in a groove (not shown) on a second vertical wall surface 116b. This allows the additional air chamber member 110 to be fixed to the first vertical wall surface 116a and the second vertical wall surface 116b of the well portion 11c.

Incidentally, it is preferable that the additional air chamber member in the conventional vehicle wheel (for example, see Patent Literature 1) is a blow-molded component made of resin from a standpoint of weight saving, reduction in production cost, securing of airtightness of an additional air chamber formed inside, and the like.

However, as for the blow-molded additional air chamber member, in a cutting process at a cut-off section for separating a molded portion from an unnecessary resin portion, a so-called burr remains on the molded portion.

More specifically, burrs remaining on leading ends of the edge portions 114a, 114b graze against the first and second vertical wall surfaces 116a, 116b to be string-like burrs in the course of the mounting shown in FIG. 11A, which are removed from the edge portions 114a, 114b. When the removed string-like burrs are caught between a bead of the tire and a bead seat of the wheel, there is a possibility that a slow leak of air pressure of the tire is caused. Moreover, when the removed burrs gain entry to a tube member, there is also a possibility that sound deadening performance is deteriorated.

In view of this, it is preferable that when the blow-molded additional air chamber member is made into a product, the edge portions 114a, 114a are shaped.

FIG. 11B is a schematic view showing a leading end of the edge portion 114a which has been shaped, and is a schematic view of the edge portion 114a viewed from the wheel circumferential direction in FIG. 11A. In FIG. 11B, reference sign 125a denotes an upper plate constituting the additional air chamber member 110, and reference sign 125b denotes a lower plate.

As shown in FIG. 11B, when the leading end of the edge portion 114a is shaped, a portion of the leading end including a burr 117 is cut off along a cutting line 115 as the boundary. This shaping allows an abutting face on which the burr 117 does not exist, relative to the vertical wall surface 116a, to be formed on the leading end of the edge portion 114a. That is, a slow leak of the tire air pressure due to the removed string-like burr 117 is reliably avoided.

CITATION LIST

Patent Literature

Patent Literature 1: Japanese Patent Publication No. 4551422 (FIG. 9B, etc.)

SUMMARY OF THE INVENTION

Technical Problem

However, since the additional air chamber member 110 in the conventional vehicle wheel (for example, see Patent Literature 1) allows the protruding portion 118 to protrude from the edge portion 114a in the wheel width direction as described above, a shaping process for the edge portion 114a becomes complicated as described below.

FIG. 11C is a view for explaining a shaping process for the edge portions 114a, 114b of the conventional additional air chamber member 110.

As shown in FIG. 11C, the shaping process for the edge portion 114b makes it possible to cut off the burr 117 (see FIG. 11B) by one process which is carried out at one time, for example, in a direction of an arrow mark 115a.

On the other hand, the shaping process for the edge portion 114a requires carrying out a first process indicated by an arrow mark 115b, which ends just before the protruding portion 118, and then carrying out a second process indicated by an arrow mark 115c. That is, the conventional vehicle wheel (for example, see Patent Literature 1) poses a problem that all of the burrs 117 (see FIG. 11B) cannot be removed without carrying out at least two processes in order to shape the edge portion 114a having the protruding portion 118. Moreover, since a shaping device for implementing the shaping process requires carrying out the shaping process indicated by the arrow mark 115a and the shaping process separated into two stages indicated by the arrow mark 115b and the arrow mark 115c, there also occurs a problem that the configuration of the shaping device in itself becomes complicated.

In view of the above, the present invention makes it an object thereof to provide a wheel for a vehicle which includes an additional air chamber member capable of simplifying a shaping process for an edge portion and configuration of a shaping device for the edge portion.

Solution to Problem

As means for solving the above problems, the present invention provides a wheel for a vehicle (vehicle wheel) including at least one additional air chamber member on an outer circumferential surface of a well portion, the additional air chamber member serving as a Helmholtz resonator in a tire air chamber, the wheel for a vehicle including: a first vertical wall surface which is formed to extend in a circumferential direction of the outer circumferential surface on a vertical wall vertically provided on the outer circumferential surface of the well portion; a second vertical wall surface which is formed to extend in the circumferential direction on a rising portion formed at one end of the well portion and faces the first vertical wall surface in a width direction of the outer circumferential surface; and a groove which is formed to extend in the circumferential direction on the first vertical wall surface and the second vertical wall surface, respectively, wherein the additional air chamber member includes: a main body made of resin which is fitted between the first vertical wall surface and the second vertical wall surface and composed of an additional air chamber and a communication hole communicating the additional air chamber with the tire air chamber; a first edge portion which is formed to extend from the main body toward the first vertical wall surface and to extend in the circumferential direction, so as to be fixedly engaged with the groove on the first vertical wall surface; a second edge portion which is formed to extend from the main body toward the second vertical wall surface and to extend in the circumferential direction, so as to be fixedly engaged with the groove on the second vertical wall surface; and a protruding portion which, on at least one of the first edge portion and the second edge portion, protrudes from the edge portion in a wheel radial direction to be fixedly engaged with the vertical wall surface, so as to restrict movement of the additional air chamber member to the circumferential direction, wherein an outer end portion in the width direction of the protruding portion is located at the same position as an outer end portion in the width direction of the edge portion on which the protruding portion is formed, or located on an inner side in the width direction relative to the outer end portion in the width direction of the edge portion.

The vehicle wheel thus configured allows the protruding portion to be located at the same position as the edge portion, or on the inner side relative to the edge portion, and therefore makes it possible, even when carrying out a shaping process for removing a burr remaining on the edge portion on which the protruding portion is formed, to shape the edge portion at one time from one end until the other end in the circumferential direction in the same manner as the edge portion on which the protruding portion is not formed. That is, this vehicle wheel makes it possible to carry out the shaping process for the edge portion without interference of the protruding portion serving as a rotation-stop which is formed on the edge portion of the additional air chamber member.

In the vehicle wheel, such a configuration can also be adopted that a pair of additional air chamber members are disposed to face each other across a wheel rotation center.

The vehicle wheel thus configured allows a wheel unbalance (static balance) generated by one of the pair of additional air chamber members to be offset by a wheel unbalance (static balance) generated by the other additional air chamber member, and therefore a counterweight to be allowed to face the additional air chamber member at the time of wheel balance adjustment becomes unnecessary.

In the vehicle wheel, such a configuration can also be adopted that the communication hole is formed inside a tube member which is disposed near one side edge in a wheel width direction of the additional air chamber member, and the tube member is provided at an end portion in a wheel circumferential direction of the additional air chamber member to extend along the wheel circumferential direction.

The vehicle wheel thus configured allows the tube member to be provided near one of the edge portions which are fixedly engaged with the first vertical wall surface and the second vertical wall surface to be firmly held by these vertical wall surfaces. This makes it possible for the vehicle wheel to more effectively prevent deformation of the additional air chamber member encountered when centrifugal force acts on the tube member, as compared to a vehicle wheel in which a tube member is disposed at the center in the width direction of the main body.

In the vehicle wheel, such a configuration can also be adopted that the main body is formed of a lower plate which is disposed along the outer circumferential surface of the well portion, and an upper plate which is curved to have a bulge above the lower plate to form the additional air chamber, and the communication hole is formed to be separated from the additional air chamber in a wheel width direction by a connecting portion at which the upper plate and the lower plate are joined to be partially integral with each other.

The vehicle wheel thus configured makes it possible to form the additional air chamber and the communication hole communicated with the additional air chamber with a simple configuration, as compared to a vehicle wheel in which a tube member separately prepared is joined to the main body to provide a communication hole communicated with an additional air chamber.

In the vehicle wheel, such a configuration can also be adopted that the connecting portion is formed of a bent plate member.

The vehicle wheel thus configured allows stiffness of the connecting portion to be heightened, and therefore makes it possible to more effectively prevent deformation of the additional air chamber member encountered when centrifugal force acts thereon.

In the vehicle wheel, such a configuration can also be adopted that the additional air chamber member includes two Helmholtz resonators which are integrally formed with each other with a partition wall as a boundary in a wheel circumferential direction, and the communication hole is formed inside a tube member which is formed at both end portions in the wheel circumferential direction of the additional air chamber member, respectively.

The vehicle wheel thus configured allows two Helmholtz resonators to be formed with one additional air chamber member, and therefore makes it possible to simplify the configuration of the vehicle wheel in itself. Moreover, this vehicle wheel allows two Helmholtz resonators to be formed with one additional air chamber member, and therefore makes it possible to decrease a shaping process for removing a burr remaining on the edge portion, as compared to a vehicle wheel in which two Helmholtz resonators are formed with two additional air chamber members.

Advantageous Effects of the Invention

The present invention allows a vehicle wheel to be provided which includes an additional air chamber member capable of simplifying a shaping process for an edge portion and configuration of a shaping device for the edge portion.

BRIEF DESCRIPTION OF DRAWINGS

FIG. 3A is a top view of the additional air chamber member viewed from the convex side in FIG. 2, and FIG. 3B is a bottom view of the additional air chamber member viewed from the concave side in FIG. 2.

DESCRIPTION OF EMBODIMENTS

A vehicle wheel according to the present invention includes an additional air chamber member (Helmholtz resonator) which cancels a road noise due to an air column resonance inside a tire air chamber, on an outer circumferential surface of a well portion.

Hereinafter, an entire configuration of the vehicle wheel will be first described, and the additional air chamber member will be then described in detail.

Figure 1:
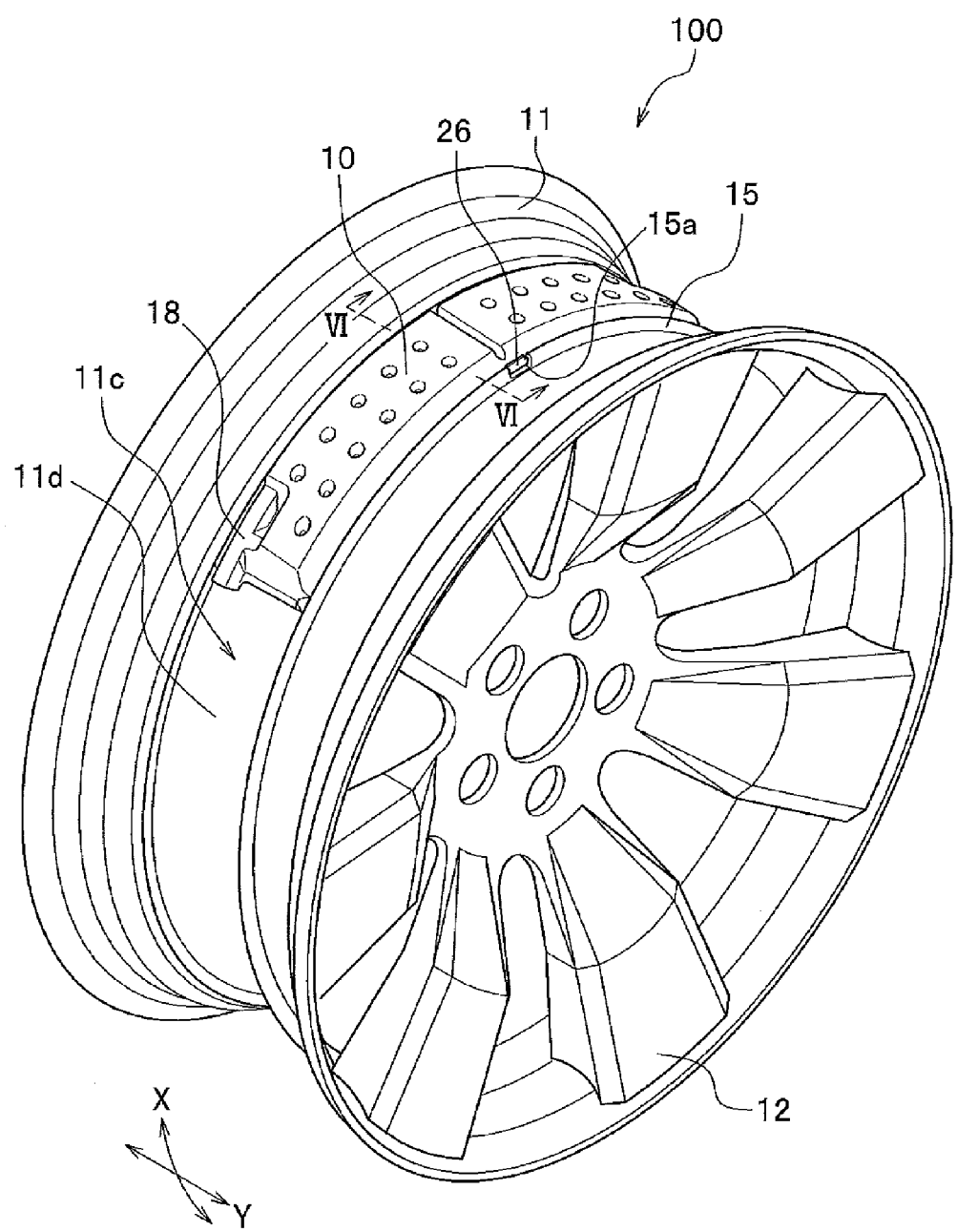
FIG. 1 is a perspective view showing a vehicle wheel according to an embodiment of the present invention.

FIG. 1 is a perspective view showing a vehicle wheel 100 according to an embodiment of the present invention.

Figure 2:
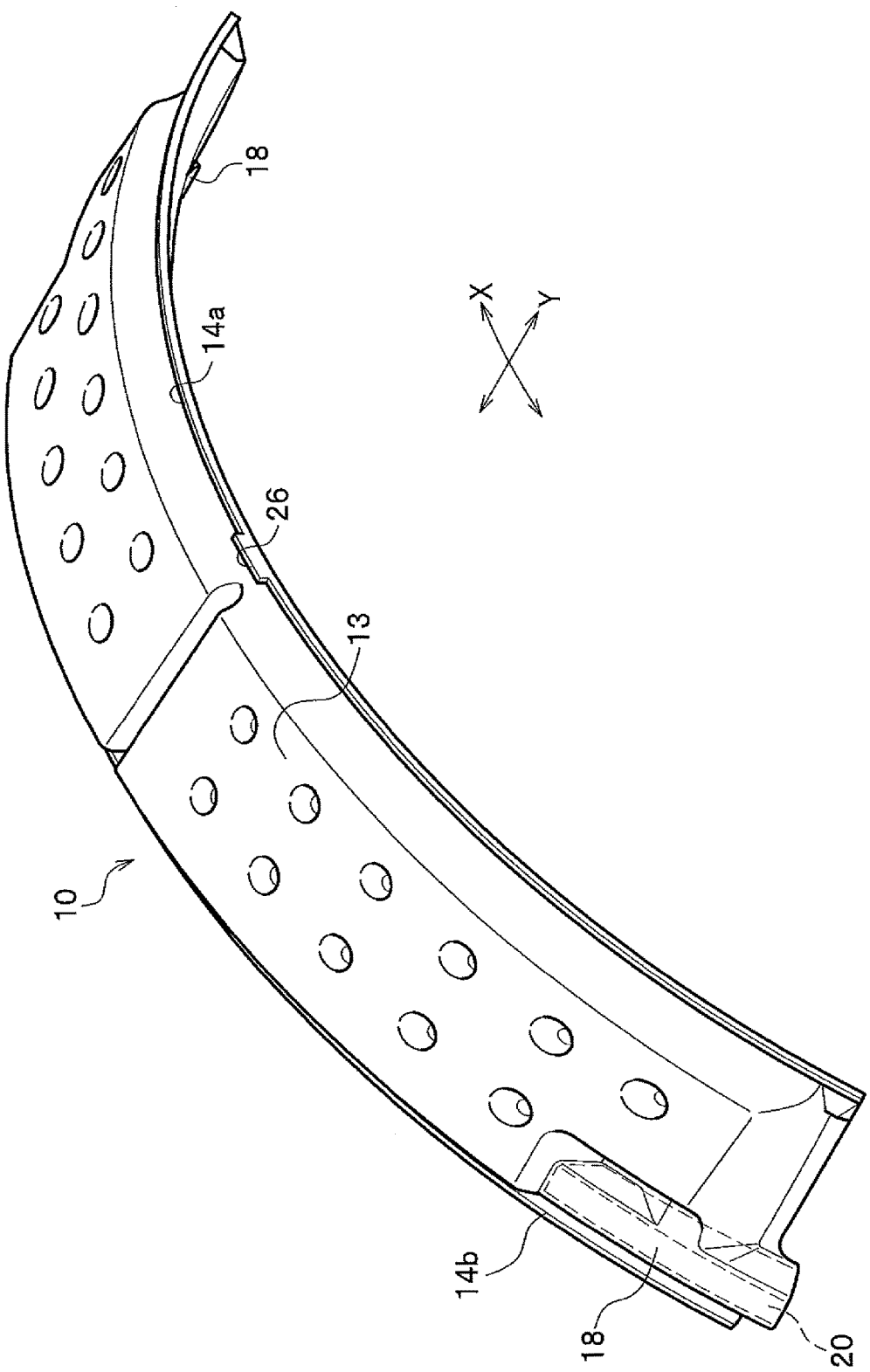
FIG. 2 is an overall perspective view showing an additional air chamber member.

As shown in FIG. 2, the vehicle wheel 100 includes a rim 11, and a disk 12 for connecting the rim 11 to a hub (not shown).

The rim 11 includes a well portion 11c which is concave inward (toward a wheel rotation center) in a wheel radial direction between bead seat portions (not shown) of the tire formed on both end portions of the rim 11 in a wheel width direction Y depicted in FIG. 1.

The well portion 11c is provided for fitting bead portions (not shown) of the tire therein when the tire not shown is mounted on the rim 11. Incidentally, the well portion 11c in the present embodiment is formed in the form of a cylinder which has nearly the same radius in the wheel width direction Y.

In FIG. 1, reference sign 11d denotes an outer circumferential surface of the well portion 11c. Reference sign 18 denotes a tube member inside which a communication hole 20 to be described later (see FIG. 2) is formed, and reference sign 15 denotes an annular vertical wall which is provided on the outer circumferential surface 11d of the well portion 11c to extend in the circumferential direction of the rim 11. Incidentally, an additional air chamber member 10 is fixedly engaged with the vertical wall 15 as described later. Reference sign 15a denotes a cut-out portion of the vertical wall 15 in which a protruding portion 26 of the additional air chamber member 10 is fitted when the additional air chamber member 10 is fixedly engaged with the vertical wall 15. Note that in FIG. 1, reference sign X denotes a wheel circumferential direction.

Next, description will be given of the additional air chamber member 10.

FIG. 2 is an overall perspective view showing the additional air chamber member 10.

As shown in FIG. 2, the additional air chamber member 10 is a member elongated in one direction and includes a hollow main body 13 having inside an additional air chamber SC to be described later (see FIG. 4), and edge portions 14a, 14b.

Note that the edge portion 14a corresponds to "first edge portion" set forth in the claims and the edge portion 14b corresponds to a "second edge portion" set forth in the claims.

The additional air chamber member 10 is curved in a longitudinal direction thereof, and adapted to follow the wheel circumferential direction X when the additional air chamber member 10 is mounted on the outer circumferential surface 11d (see FIG. 1) of the well portion 11c (see FIG. 1). Reference sign 18 denotes the tube member constituting part of the main body 13, inside which the communication hole 20 communicated with the additional air chamber SC (see FIG. 4) is formed. Reference sign 26 denotes the protruding portion to be described later which is provided on the edge portion 14a, and reference sign Y denotes the wheel width direction.

FIG. 3A to be next referred to is a top view of the additional air chamber member 10 viewed from the convex side in FIG. 2, and FIG. 3B is a bottom view of the additional air chamber member 10 viewed from the concave side in FIG. 2.

As shown in FIG. 3A, the additional air chamber member 10 has an elongated rectangular shape in planar view. The planar shape of the main body 13, plus a formation region of the tube member 18 (inclusive of a formation region of a connecting portion 35 to be described in detail later), is nearly a rectangle which is somewhat smaller than the planar shape of the additional air chamber member 10.

The main body 13 inside which the additional air chamber SC (see FIG. 4) to be described later is formed, that is, the main body 13 except for the tube member 18 and the connecting portion 35 has the shape of nearly a hat (nearly a convex shape) in a top view (planar view) of FIG. 3A.

More specifically, the main body 13 having the additional air chamber SC (see FIG. 4) formed inside is constituted by a high-crowned portion in the shape of nearly a hat and a flange portion in the shape of nearly a hat. In other words, the main body 13 is mainly constituted by a full-width portion 13a (corresponding to the high-crowned portion) which extends with the maximum width in the wheel circumferential direction X, and an expanding portion 13b (corresponding to the flange portion) which is provided in parallel with the tube member 18 in the wheel width direction Y and expands from the full-width portion 13a in the wheel circumferential direction X.

As shown in FIG. 3A, on the upper surface side of the main body 13 (the convex side of the additional air chamber member 10), a ditch D1 is provided in the middle in the longitudinal direction of the main body 13 to extend in the width direction (wheel width direction Y) so as to cross the main body 13. As described later, the ditch D1 is formed to allow an upper plate 25a (see FIG. 4) of the main body 13 to be concave toward a lower plate 25b (see FIG. 4).

Moreover, as shown in FIG. 3B, on the lower surface side of the main body 13 (the concave side of the additional air chamber member 10), a ditch D2 is provided in the middle in the longitudinal direction of the main body 13 to extend in the width direction (wheel width direction Y) so as to cross the main body 13. As described later, the ditch D2 is formed to allow the lower plate 25b (see FIG. 4) of the main body 13 to be concave toward the upper plate 25a (see FIG. 4).

Incidentally, the ditch D1 and the ditch D2 constitute a partition wall W (see FIG. 4) to be described later which allows the upper plate 25a and the lower plate 25b to be partially connected with each other. This partition wall W divides a hollow portion of the main body 13 into two halves to form a pair of additional air chambers SC (see FIG. 4) to be described later within the main body 13.

As shown in FIG. 3A, each of a pair of tube members 18 is disposed at both ends in the longitudinal direction (wheel circumferential direction X) of the additional air chamber member 10 and near one side edge in the widthwise direction (wheel width direction Y) of the additional air chamber member 10. More specifically, the tube member 18 in the present embodiment is disposed near one edge portion 14b of two edge portions 14a, 14b.

The tube member 18 extends along the longitudinal direction (wheel circumferential direction X) of the additional air chamber member 10. Each of the communication holes 20 (see FIG. 3B) formed inside the pair of tube members 18 allows the pair of additional air chambers SC (see FIG. 4) to be individually communicated with the exterior. That is, the additional air chamber member 10 has the configuration in which two Helmholtz resonators 19a, 19b are integrally formed with each other with the ditch D1 and the ditch D2 as the boundary.

Each of the edge portions 14a, 14b extends from the main body 13 in the widthwise direction (wheel width direction Y) of the additional air chamber member 10. The edge portions 14a, 14b are adapted to make the additional air chamber member 10 fixedly engaged with the well portion 11c (see FIG. 1). The edge portions 14a, 14b will be described in detail later.

In FIG. 3A, reference sign 26 denotes the protruding portion to be described in detail later, and reference sign 33a denotes an upper side connecting portion, and in FIG. 3B, reference sign 30 denotes a bead, and reference sign 33b denotes a lower side connecting portion. The upper side connecting portion 33a, the bead 30, and the lower side connecting portion 33b will be described with reference to FIG. 4 and FIG. 5 below.

Figure 4:
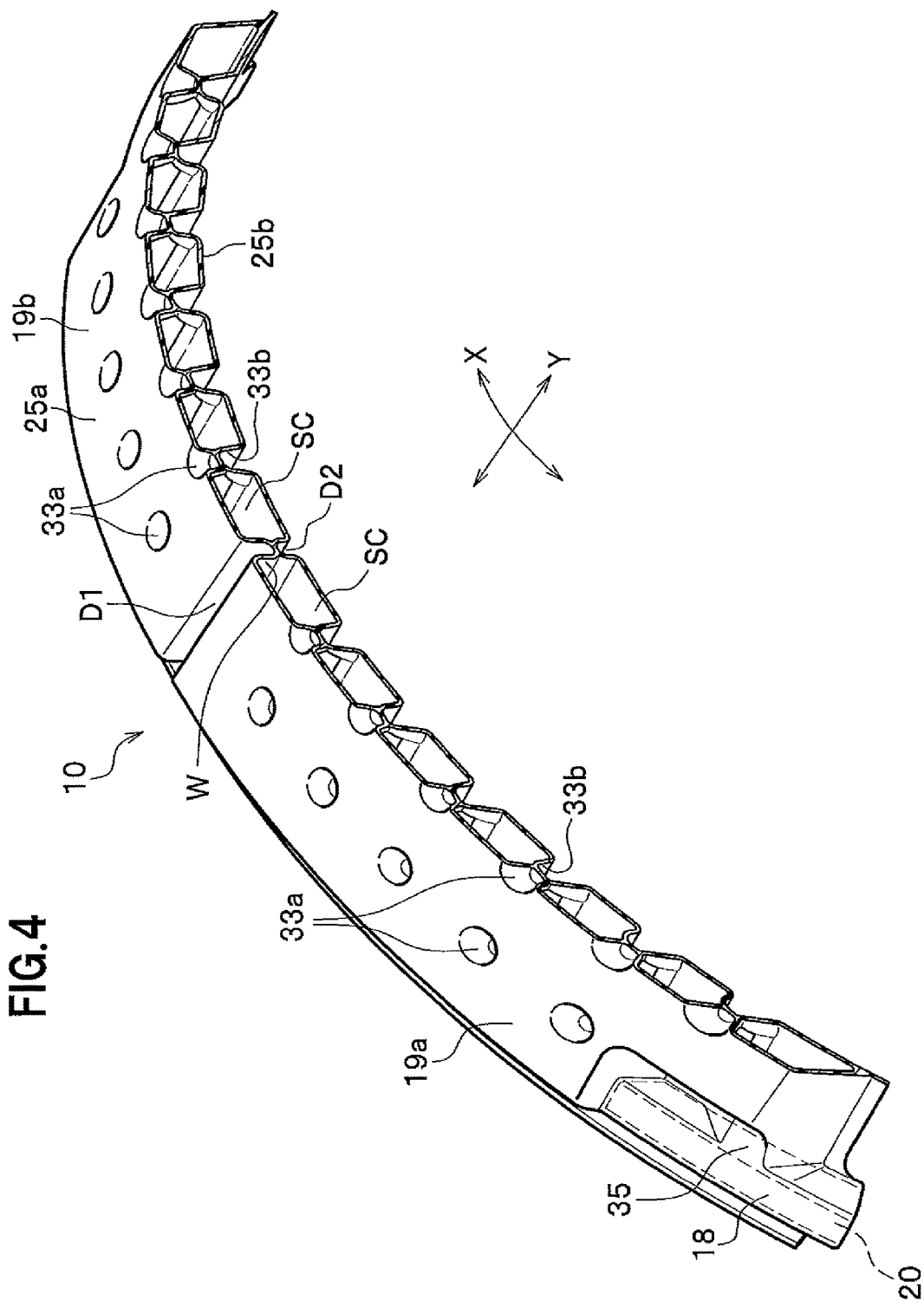
FIG. 4 is a perspective view showing the additional air chamber member which is cut off along IV-IV line in FIGS. 3A and 3B.

FIG. 4 is a perspective view showing the additional air chamber member 10 which is cut off along IV-IV line in FIGS. 3A and 3B.

Figure 5:
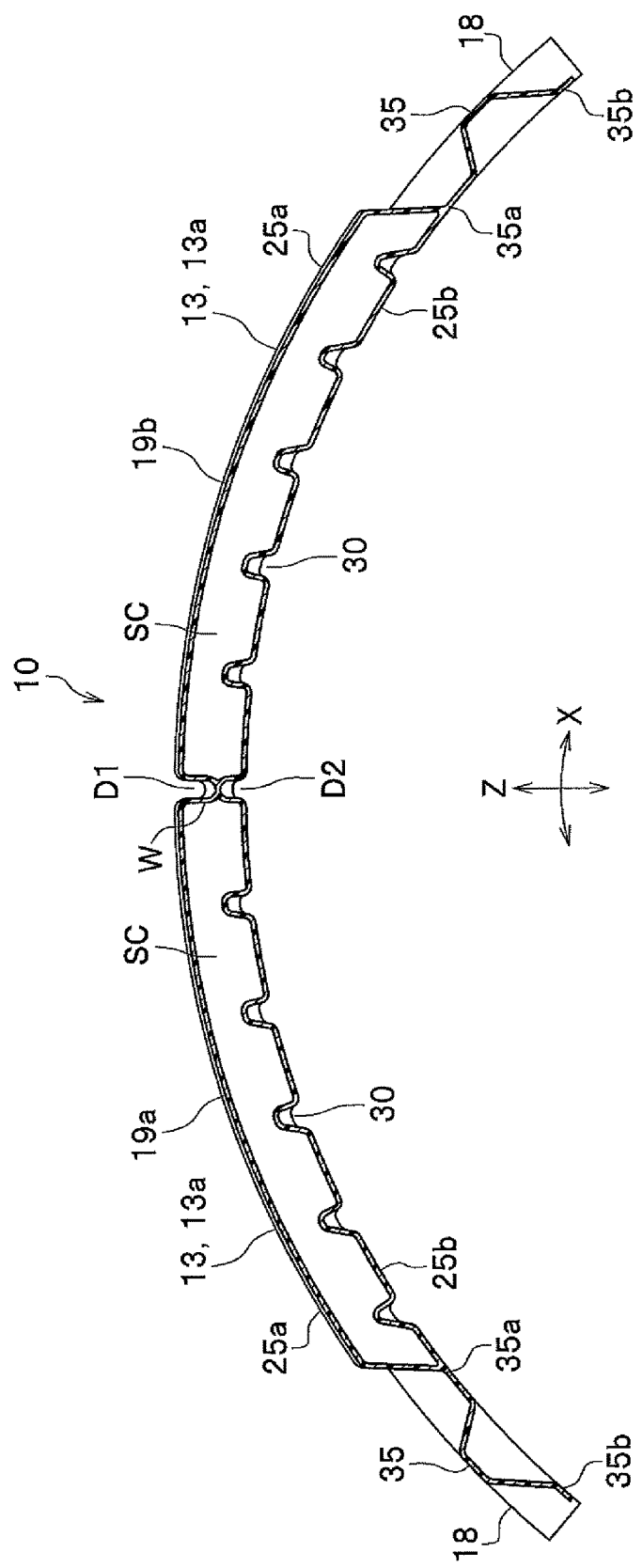
FIG. 5 is a cross-sectional view taken along V-V line in FIGS. 3A and 3B.

FIG. 5 is a cross-sectional view taken along V-V line in FIGS. 3A and 3B.

As shown in FIG. 4 and FIG. 5, the main body 13 of the additional air chamber member 10 includes the lower plate 25b, and the upper plate 25a which forms the additional air chamber SC between the lower plate 25b and the upper plate 25a. Note that in the present embodiment, each of resin materials constituting the upper plate 25a and the lower plate 25b has the same thickness, but these thicknesses may differ from each other.

The upper plate 25a is curved to have a bulge above the lower plate 25b which is disposed along the outer circumferential surface 11d of the well portion 11c, to form the additional air chamber SC.

Incidentally, the communication hole 20 in the tube member 18 extending in the wheel circumferential direction X, as shown in FIG. 4, is communicated with the additional air chamber SC at one end thereof in the wheel circumferential direction X and opens to the exterior at the other end thereof.

A volume of around 50 to 250 cc is preferable for each of the additional air chambers SC, SC. By setting the volume of the additional air chamber SC within the above range, each of the Helmholtz resonators 19a, 19b can suppress an increase in the weight to achieve weight saving of the vehicle wheel 100, while sufficiently exerting a sound deadening effect. In addition, in consideration of weight adjustment of the vehicle wheel 100 and assembling easiness of the additional air chamber member 10 with the well portion 11c, a length of the additional air chamber member 10 in the wheel circumferential direction X can be set as appropriate within a maximum of half the circumferential length of the rim 11 (see FIG. 1) (the circumferential length of the outer circumferential surface 11d of the well portion 11c).

The communication hole 20 is adapted to allow the additional air chamber SC to be communicated with a tire air chamber MC (see FIG. 6) which is to be formed between the well portion 11c (see FIG. 1) and the tire not shown.

A cross-sectional shape of the communication hole 20 is not particularly limited, and may be any one of an ellipsoidal shape, a circular shape, a polygonal shape, and a D-shape. It is preferable that a diameter of the communication hole 20 is 5 mm or more if the cross section has a circular shape. Also, it is preferable that the communication hole 20 having a cross-sectional shape other than a circle has a diameter of 5 mm or more converted into a circle of the same cross-sectional area as the cross-sectional shape.

A length of the communication hole 20 is set to meet a formula for calculating a resonant frequency of the Helmholtz resonator expressed in the following (formula 1).

$$f_0 = C/2\pi \times \sqrt{(S/V(L+\alpha \times \sqrt{S}))} \quad \text{(formula 1)}$$

$f_0$ (Hz): Resonant frequency
C (m/s): Sonic speed in additional air chamber SC (=Sonic speed in tire air chamber MC)
V (m³): Volume of additional air chamber SC
L (m): Length of communication hole 20
S (m²): Cross-sectional area of opening of communication hole 20
α: Correction coefficient Note that the resonant frequency $f_0$ is set to meet a resonant frequency of the tire air chamber MC.

As shown in FIG. 4, the upper side connecting portions 33a are formed on the upper plate 25a constituting the main body 13. The upper side connecting portions 33a are formed to allow the upper plate 25a to be concave toward the lower plate 25b, and have a circular shape in planar view. As shown in FIG. 2, the upper side connecting portions 33a are formed along the longitudinal direction of the additional air chamber member 10 (wheel circumferential direction X) to allow two upper side connecting portions 33a to line up in the width direction of the main body 13. More specifically, as shown in FIG. 3A, a total of twenty upper side connecting portions 33a in two rows are formed on the full-width portion 13a and one upper side connecting portion 33a is formed on both of the expanding portions 13b, respectively. That is, a total of two upper side connecting portions 33a are formed on the expanding portions 13b.

As shown in FIG. 4, the lower side connecting portions 33b are formed on the lower plate 25b at positions corresponding to the upper side connecting portions 33a.

The lower side connecting portions 33b are formed to allow the lower plate 25b to be concave toward the upper plate 25a, and have a circular shape in planar view. The lower side connecting portions 33b allow leading ends thereof to be integral with leading ends of the upper side connecting portions 33a on the upper plate 25a to partially connect the upper plate 25a with the lower plate 25b.

Incidentally, the upper side connecting portions 33a and the lower side connecting portions 33b connected with each other within the additional air chamber SC have the configuration which improves a mechanical strength of the additional air chamber member 10 and suppresses fluctuation in the volume of the additional air chamber SC to more effectively exert a sound deadening function to be described later.

Note that in the present invention, such a configuration can also be adopted that the upper side connecting portions 33a and the lower side connecting portions 33b are not provided.

As shown in FIG. 4 and FIG. 5, the additional air chamber member 10 allows the hollow portion of the main body 13 to be divided by the partition wall W into two additional air chambers SC.

In addition, the additional air chamber member 10 has the configuration in which two Helmholtz resonators 19a, 19b are integrally formed with each other with the partition wall W as the boundary as described above.

Incidentally, the partition wall W is formed by allowing the ditch D1 formed on the upper plate 25a and the ditch D2 formed on the lower plate 25b to be joined to each other as described above, and in the present embodiment, the partition wall W divides the hollow portion of the main body 13 into two halves to form a pair of additional air chambers SC.

Note that the partition wall W needs only be capable of partitioning the hollow portion of the main body 13 to form two additional air chambers SC and may be formed, for example, by joining the upper plate 25a and the lower plate 25b to each other with only the ditch D1 without forming the ditch D2. Alternatively, the partition wall W may be formed by joining the upper plate 25a and the lower plate 25b to each other with only the ditch D2 without forming the ditch D1.

Next, description will be given of a connecting portion 35 which is formed between the expanding portion 13b of the main body 13 and the tube member 18.

As shown in FIG. 4 and FIG. 5, the connecting portion 35 is formed by joining the upper plate 25a and the lower plate 25b to be partially integral with each other between the expanding portion 13b and the tube member 18.

More specifically, as shown in FIG. 5, the connecting portion 35 allows the upper plate 25a and the lower plate 25b to be joined and unified at each of end portions in the wheel circumferential direction X of the full-width portion 13a of the main body 13 to form a base end 35a. Also, the connecting portion 35 is constituted by a bent plate member forming a bent portion which extends from the base end 35a in the wheel circumferential direction X and protrudes, halfway on the extension, outward in the wheel radial direction Z. Incidentally, in the present embodiment, the base end 35a and a leading end 35b of the connecting portion 35 are formed at the same height as the lower plate 25b (on the same curved surface in the wheel circumferential direction X of the lower plate 25b).

As shown in FIG. 5, the bead 30 described above (see FIG. 3B) is formed to allow the lower plate 25b to be partially concave toward the upper plate 25a. As shown in FIG. 3B, the bead 30 in the present embodiment extends in the width direction of the additional air chamber member 10 (wheel width direction Y) at the position of formation of the lower side connecting portion 33b. That is, the bead 30 is joined to the lower side connecting portion 33b, thereby enhancing surface stiffness of the lower plate 25b (see FIG. 5).

Figure 6:
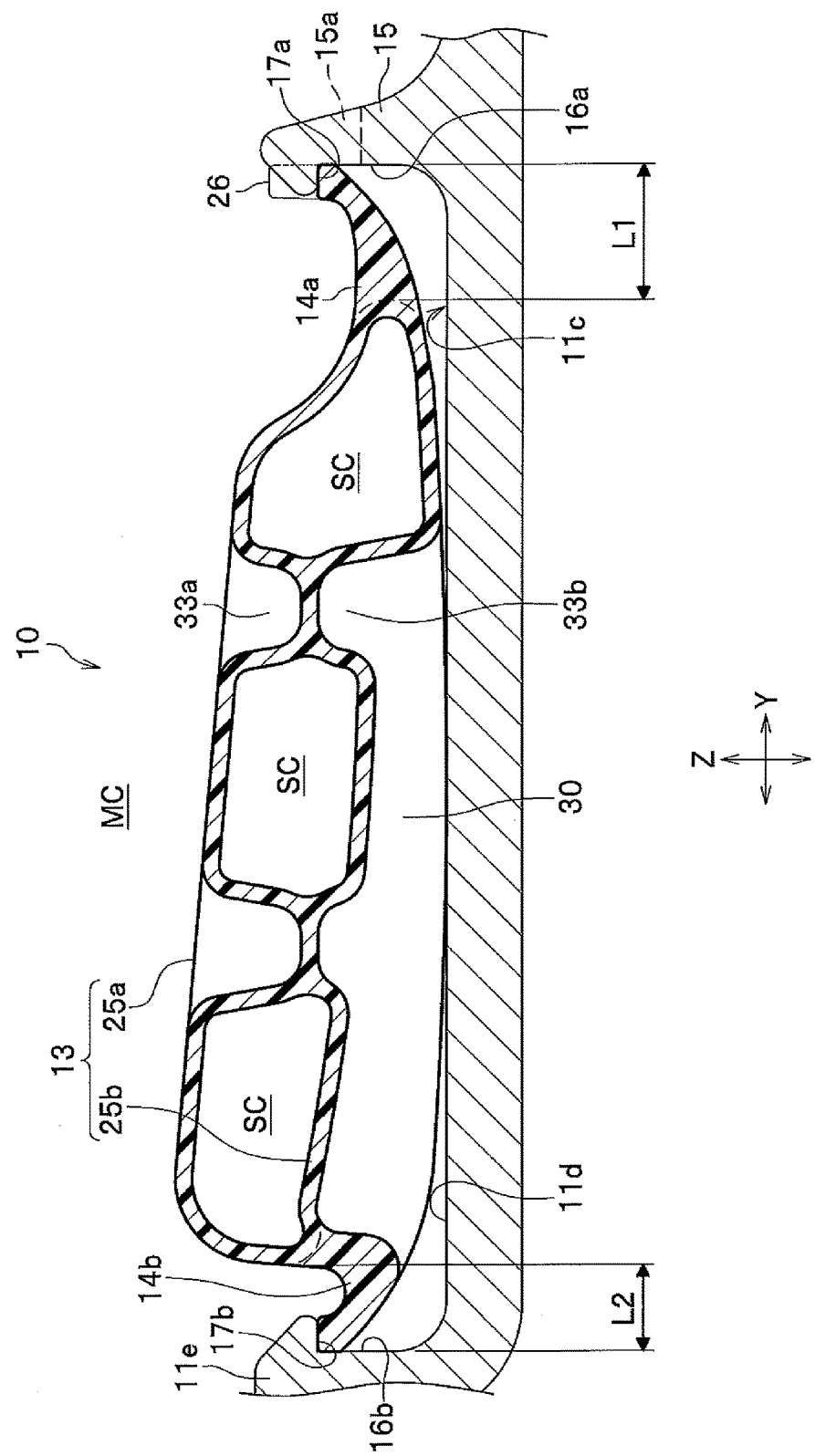
FIG. 6 is a cross-sectional view taken along VI-VI line in FIG. 1 and is a view including a cross-section of the additional air chamber member taken along VI-VI line in FIGS. 3A and 3B.

Next, description will be given of a mode of mounting of the additional air chamber member 10 on the well portion 11c (see FIG. 1). FIG. 6 is a cross-sectional view taken along VI-VI line in FIG. 1 and is a view including a cross-section of the additional air chamber member 10 taken along VI-VI line in FIGS. 3A and 3B.

As shown in FIG. 6, the edge portion 14a and the edge portion 14b are formed to extend from the main body 13 which is formed of the upper plate 25a and the lower plate 25b as described above, in the wheel width direction Y The edge portion 14a extends from the main body 13 toward the first vertical wall surface 16a to allow the leading end thereof to be fitted in a groove 17a on the first vertical wall surface 16a. Also, the second edge portion 14b extends from the main body 13 toward the second vertical wall surface 16b to allow the leading end thereof to be fitted in a groove 17b on the second vertical wall surface 16b.

Incidentally, the first vertical wall surface 16a is defined by a side surface on the inner side (left side in FIG. 6) in the wheel width direction Y of the vertical wall 15. Also, the second vertical wall surface 16b is defined by a side surface portion (rising portion) 11e of the well portion 11c which faces the first vertical wall surface 16a. Moreover, the grooves 17a, 17b are formed along the circumferential direction on the outer circumferential surface 11d of the well portion 11c to form an annular groove, respectively. In the present embodiment, the vertical wall 15 and the side surface portion 11e are shaped integral with the well portion 11c when the rim 11 (see FIG. 1) is cast, and the grooves 17a, 17b are formed by machining the vertical wall 15 and the side surface portion 11e, respectively.

In the present embodiment, of the edge portion 14a and the edge portion 14b, a length L2 of one edge portion 14b is set to be shorter than a length L1 of the other edge portion 14a. Here, the length L1 of the edge portion 14a is equal to a distance from an outer end of the main body 13 on the side of the first vertical wall surface 16a until a bottom of the groove 17a, and in the present embodiment, is equal to a distance from the outer end of the main body 13 until the first vertical wall surface 16a. Also, the length L2 of the edge portion 14b is equal to a distance from an outer end of the main body 13 on the side of the second vertical wall surface 16b until a bottom of the groove 17b, and in the present embodiment, is equal to a distance from the outer end of the main body 13 until the second vertical wall surface 16b.

The edge portion 14a and the edge portion 14b extending toward the first vertical wall surface 16a and the second vertical wall surface 16b are integral with the curved lower plate 25b to form a curved surface, respectively, which is convex toward the outer circumferential surface 11d of the well portion 11c. In addition, the edge portions 14a, 14b have elasticity such as a spring by selecting the thickness and/or material thereof as appropriate.

In FIG. 6, reference sign SC denotes the additional air chamber and reference sign MC denotes the tire air chamber which is formed between the tire not shown and the well portion 11c. Reference sign 26 denotes the protruding portion which is fitted in the cut-out portion 15a of the vertical wall 15.

Incidentally, in the present embodiment, the outer end portion in the wheel width direction Y of the protruding portion 26 is located at the same position as the outer end portion in the wheel width direction Y of the edge portion 14a on which the protruding portion 26 is formed.

Figure 7A:
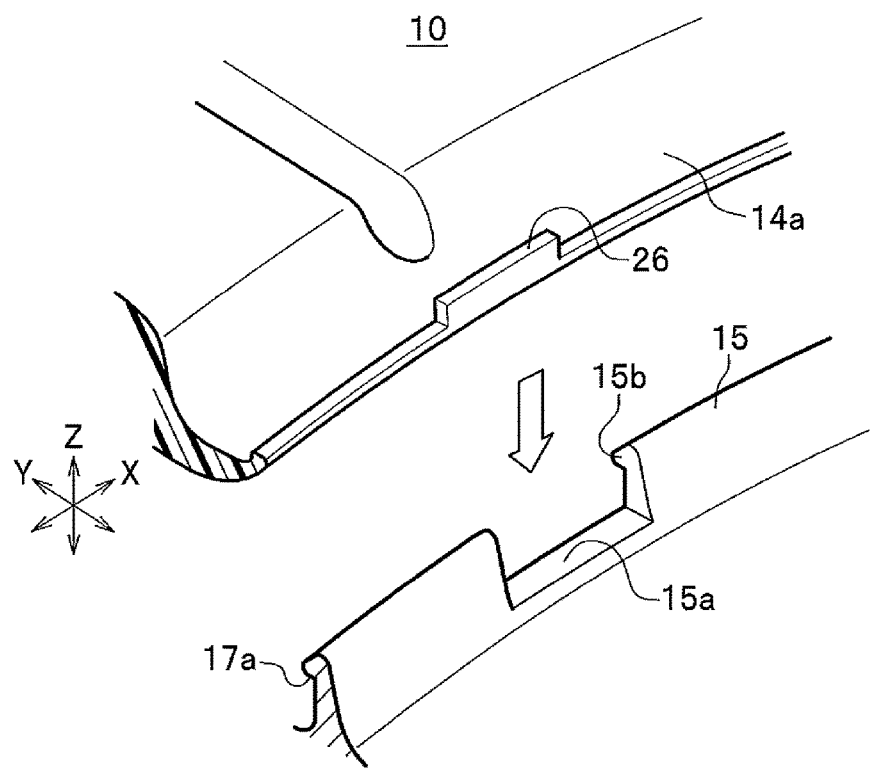
FIG. 7A is a partially enlarged perspective view showing the vicinity of a protruding portion of the additional air chamber member and the vicinity of a cut-out portion formed in a vertical wall of a well portion.
Figure 7B:
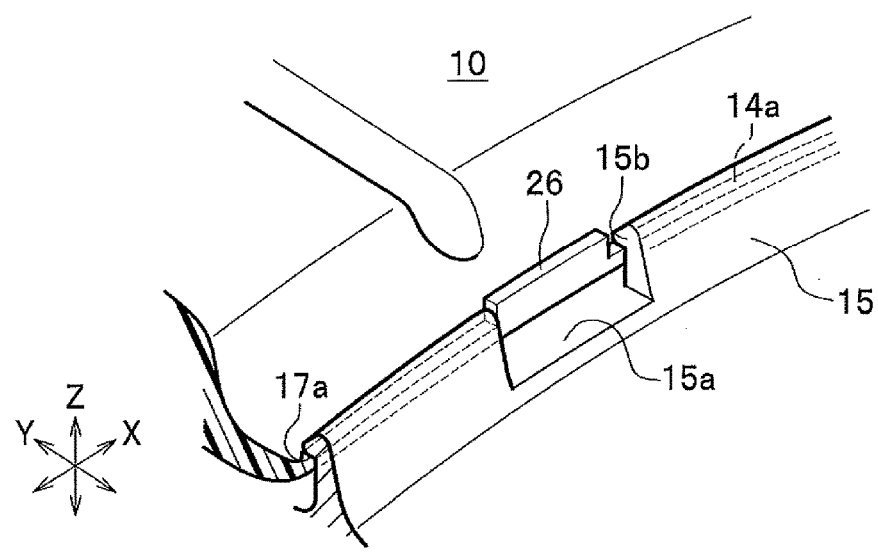
FIG. 7B is a partially enlarged perspective view showing the protruding portion fitted in the cut-out portion.

FIG. 7A to be next referred to is a partially enlarged perspective view showing the vicinity of the protruding portion 26 of the additional air chamber member 10 and the vicinity of the cut-out portion 15a formed in the vertical wall 15 of the well portion 11c, and FIG. 7B is a partially enlarged perspective view showing the protruding portion 26 fitted in the cut-out portion 15a.

As shown in FIG. 7A, the protruding portion 26 is constituted by a section (rectangular parallelepiped elongated in the wheel circumferential direction X) which is formed to protrude outward in the wheel radial direction Z (upward in an arrow mark Z) at the leading end of the edge portion 14a of the additional air chamber member 10. A width in the wheel circumferential direction X of the protruding portion 26 is set to such a width as to allow the protruding portion 26 to be fitted in the cut-out portion 15a formed on the vertical wall 15.

Also, as shown in FIG. 7B, a protruding height of the protruding portion 26 is set to a height at which the protruding portion 26 can abut on an inside upper portion 15b of the cut-out portion 15a when the leading end of the edge portion 14a is fitted in the groove 17a of the vertical wall 15.

This allows the protruding portion 26 to be fitted in the cut-out portion 15a of the vertical wall 15 when the additional air chamber member 10 is fixedly engaged with the vertical wall 15 through the edge portion 14a, to thereby serve as a rotation-stop of the additional air chamber member 10 to the wheel circumferential direction X.

The additional air chamber member 10 according to the present embodiment configured as described above assumes a molded component made of resin. Note that, in the case of a resin component, in view of weight saving, improvement in mass productivity, reduction in production cost, securing of airtightness of the additional air chamber SC, and the like, resin is preferably used which is light in weight, high in stiffness and able to be blow-molded. Of resin, polypropylene is particularly preferable which is also resistant to repetitive bending fatigue.

Figure 8A:
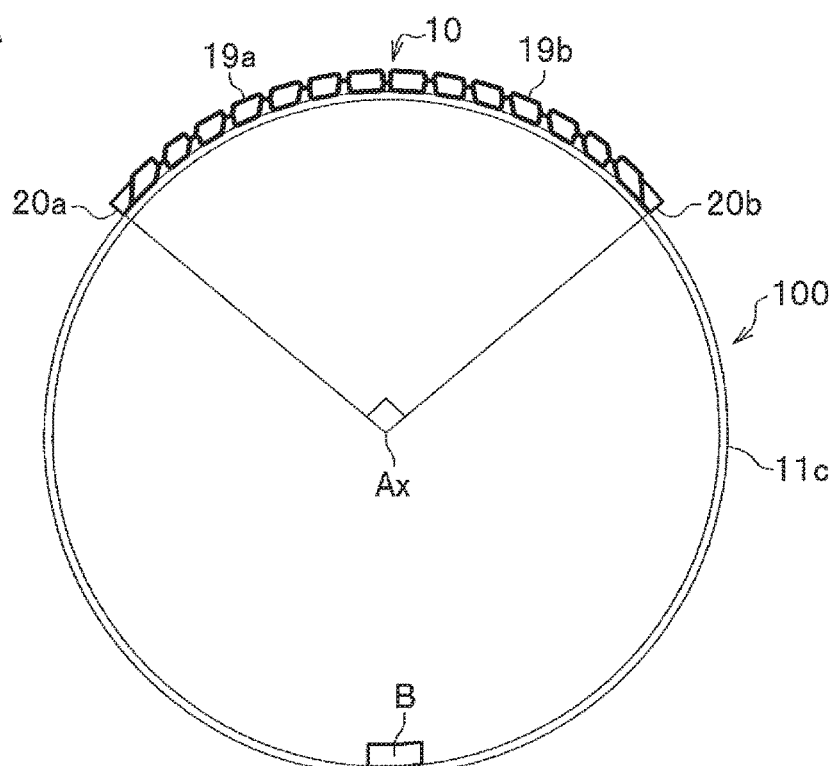
FIG. 8A is a schematic view showing a state in which the additional air chamber member is disposed on the well portion in the vehicle wheel according to the embodiment of the present invention.
Figure 8B:
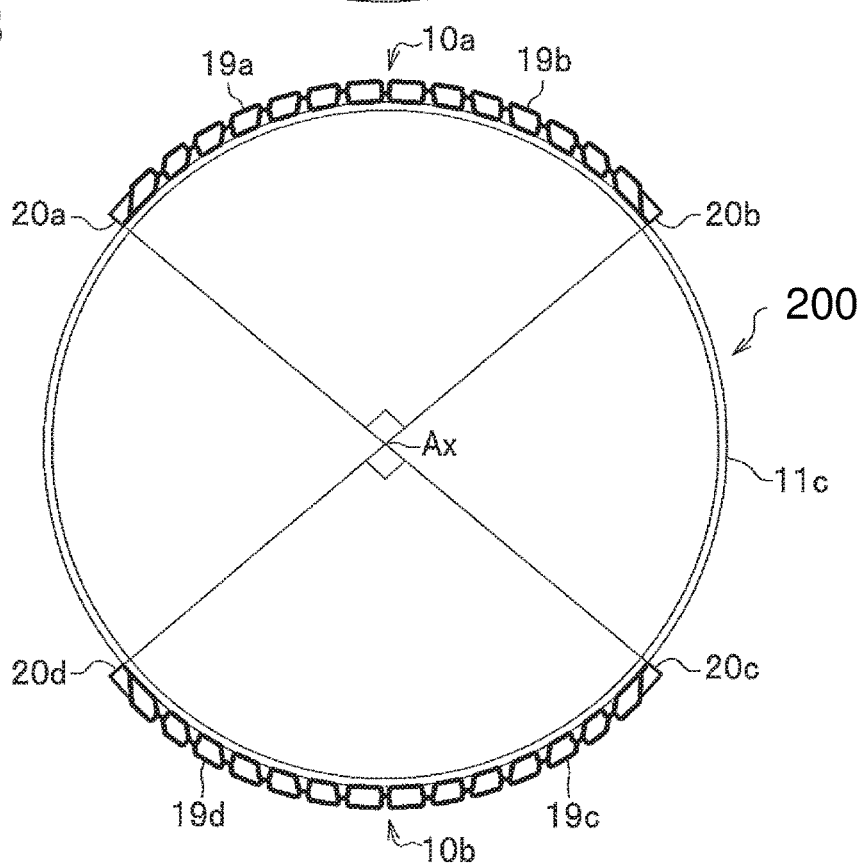
FIG. 8B is a schematic view showing a state in which additional air chamber members are disposed on the well portion in the vehicle wheel according to another embodiment of the present invention.

Next, description will be given of a position of the additional air chamber member 10 in the vehicle wheel 100 according to the present embodiment. FIG. 8A is a schematic view showing a state in which the additional air chamber member 10 is disposed on the well portion 11c in the vehicle wheel 100 according to the embodiment of the present invention, and FIG. 8B is a schematic view showing a state in which additional air chamber members 10a, 10b are disposed on the well portion 11c in a vehicle wheel 200 according to another embodiment of the present invention.

As shown in FIG. 8A, the vehicle wheel 100 according to the present embodiment has the configuration described above in which two Helmholtz resonators 19a, 19b are integrally formed with each other, and a communication hole 20a of the Helmholtz resonator 19a and a communication hole 20b of the Helmholtz resonator 19b are spaced from each other in the circumferential direction at an angle of 90 degrees around a wheel rotation center Ax.

Reference sign B denotes a counterweight which is adapted to offset a wheel unbalance (static balance) which is generated by mounting the additional air chamber member 10 on the well portion 11c.

The vehicle wheel 100 thus configured allows the communication holes 20a, 20b to be spaced from each other in the circumferential direction at the angle of 90 degrees around the wheel rotation center Ax, thereby making it possible to prevent generation of a so-called sound deadening irregularity.

Moreover, as shown in FIG. 8B, the vehicle wheel 200 according to another embodiment of the present invention allows a first additional air chamber member 10a and a second additional air chamber member 10b to be mounted on the well portion 11c to face each other across the wheel rotation center AX. Incidentally, the first additional air chamber member 10a and the second additional air chamber member 10b have the same structure as the additional air chamber member 10 described above.

In addition, each of communication holes 20a, 20b of two Helmholtz resonators 19a, 19b in the first additional air chamber member 10a and each of communication holes 20c, 20d of two Helmholtz resonators 19c, 19d in the second additional air chamber member 10b are spaced from each other in the circumferential direction at an angle of 90 degrees around the wheel rotation center Ax.

The vehicle wheel 100 according to another embodiment thus configured makes it possible to prevent generation of a sound deadening irregularity and allows a wheel unbalance (static balance) generated by one of the first additional air chamber member 10a and the second additional air chamber member 10b to be offset by a wheel unbalance (static balance) generated by the other additional air chamber member, and therefore the counterweight B to be allowed to face the additional air chamber member 10 at the time of wheel balance adjustment becomes unnecessary.

Figure 9A:
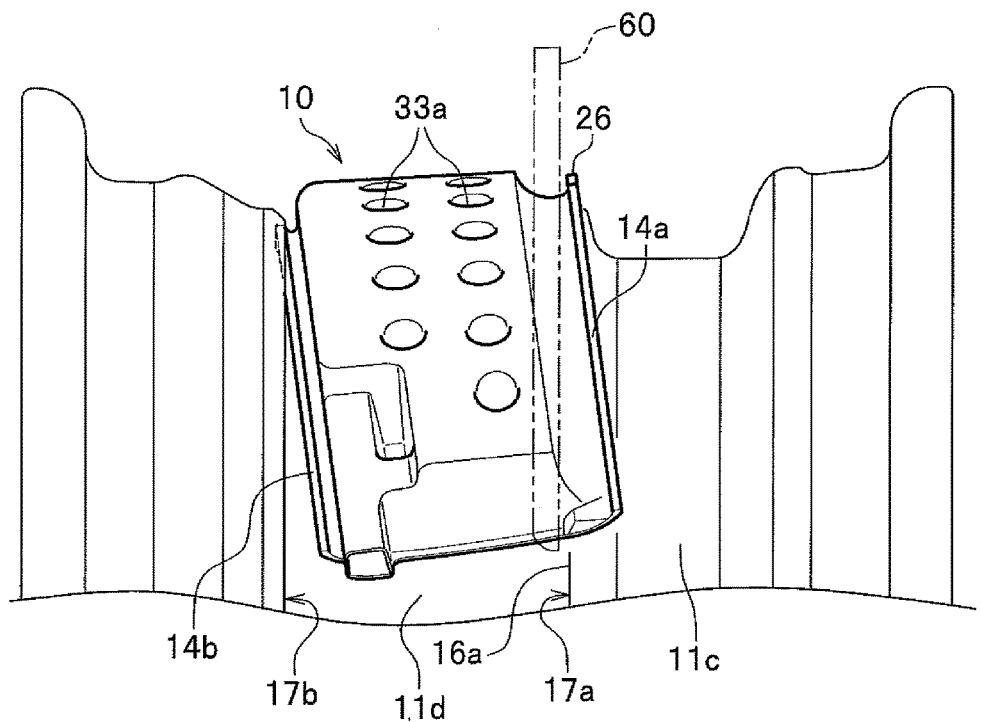
FIGS. 9A and 9B are explanatory views of a process showing a mounting method of the additional air chamber member on the well portion of a rim.
Figure 9B:
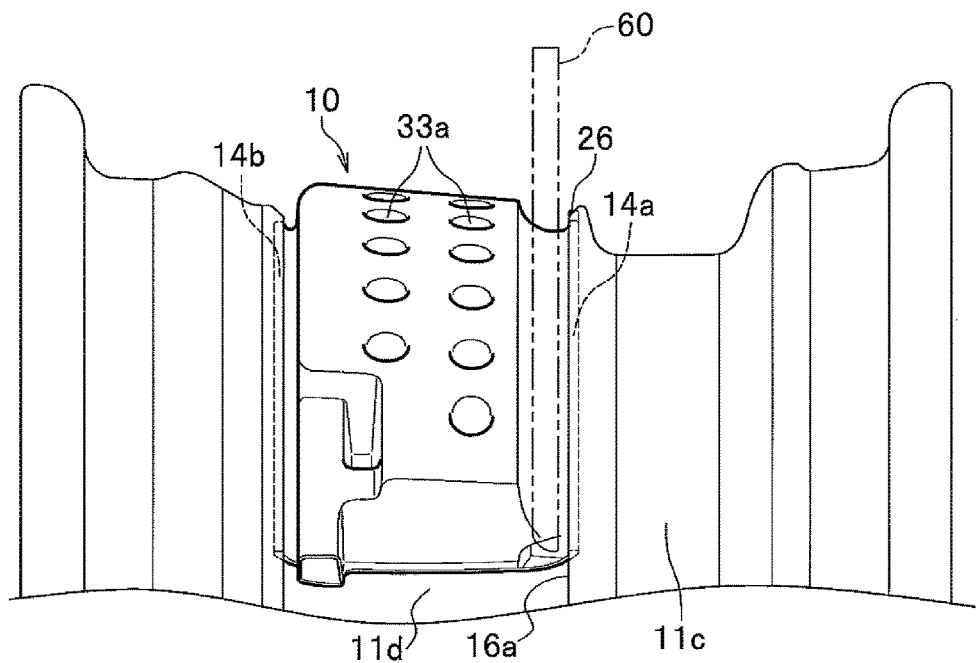

Next, description will be given of a mounting method of the additional air chamber member 10 on the well portion 11c. FIGS. 9A and 9B are explanatory views of a process showing a mounting method of the additional air chamber member 10 on the well portion 11c.

Note that in the present embodiment, as shown in FIGS. 9A and 9B, the mounting of the additional air chamber member 10 on the well portion 11c assumes use of a pusher (pressing device) 60 which presses the edge portion 14a at a position close to the groove 17a toward the outer circumferential surface 11d of the well portion 11c.

Examples of the pusher 60 include, for example, a pusher which presses the edge portion 14a (see FIGS. 9A and 9B) with air pressure of an air cylinder. Note that in FIGS. 9A and 9B, the pusher 60 is shown by a virtual line (two-dot chain line) for convenience of drawing figures.

Examples of the pusher 60 used in the present embodiment include, for example, a plate-like member provided with an edge portion which has an arc-shaped contour conforming to a curvature in the longitudinal direction (wheel circumferential direction X in FIG. 2) of the additional air chamber member 10, but the pusher 60 applicable to the present invention is not limited to the above plate-like member and can be altered in design as appropriate.

As shown in FIG. 9A, the mounting method includes first inclining the additional air chamber member 10 to allow the edge portion 14b with a shorter length to be partially fitted in the groove 17b.

Then, the pusher 60 shown by the virtual line in FIG. 9A is pressed against the edge portion 14a with a longer length. Reference sign 11d denotes the outer circumferential surface of the well portion 11c.

Next, as shown in FIG. 9B, when the pusher 60 presses the edge portion 14a toward the outer circumferential surface 11d of the well portion 11c, the edge portion 14b is gradually fitted in the groove 17b according as an inclined angle of the additional air chamber member 10 relative to the outer circumferential surface 11d of the well portion 11c becomes small.

At this time, the edge portion 14a with a longer length having elasticity such as a spring bends depending on a pressing force of the pusher 60.

When the pusher 60 further presses the edge portion 14a toward the outer circumferential surface 11d of the well portion 11c, the edge portion 14a is fitted in the groove 17a formed on the first vertical wall surface 16a as shown in FIG. 6. At this time, the protruding portion 26 is fitted in the cut-out portion 15a (see FIG. 7B) of the vertical wall 15. Then, the edge portion 14a and the edge portion 14b are completely fitted in the groove 17a and the groove 17b, respectively, to allow the additional air chamber member 10 to be mounted on the well portion 11c.

Next, description will be given of operations and effects produced by the vehicle wheel 100 according to the present embodiment.

As shown in FIG. 6, the vehicle wheel 100 allows the outer end portion in the wheel width direction Y of the protruding portion 26 to be located at the same position as the outer end portion in the wheel width direction Y of the edge portion 14a on which the protruding portion 26 is formed.

More specifically, as shown in FIG. 3A, in the top view of the additional air chamber member 10, the outer end of the edge portion 14a and the outer end of the protruding portion 26 are arranged in alignment with each other. Accordingly, the vehicle wheel 100 makes it possible, even when carrying out a shaping process for removing a burr (see reference sign 117 shown in FIG. 11B) remaining on the edge portion 14a on which the protruding portion 26 is formed, to shape the edge portion 14a at one time from one end until the other end in the wheel circumferential direction X in the same manner as the edge portion 14b on which the protruding portion 26 is not formed. Therefore, the vehicle wheel 100 makes it possible to carry out the shaping process for the edge portion 14a without interference of the protruding portion 26 serving as a rotation-stop which is formed on the edge portion 14a of the additional air chamber member 10.

Thus the vehicle wheel 100 according to the present embodiment makes it possible to simplify the shaping process for the edge portion 14a of the additional air chamber member 10 and configuration of a shaping device for the edge portion 14a.

The communication hole 20 in the vehicle wheel 100 is formed inside the tube member 18 which is disposed near one side edge in the wheel width direction Y of the additional air chamber member 10. Moreover, the tube member 18 is provided at the end portion in the wheel circumferential direction X of the additional air chamber member 10 to extend along the wheel circumferential direction X.

The vehicle wheel 100 thus configured allows the tube member 18 to be provided near one of the edge portions which are fixedly engaged with the first vertical wall surface 16a and the second vertical wall surface 16b to be firmly held by these vertical wall surfaces 16a, 16b. This makes it possible for the vehicle wheel 100 to more effectively prevent deformation of the additional air chamber member 10 encountered when centrifugal force acts on the tube member 18, as compared to a vehicle wheel in which the tube member 18 is disposed at the center in the wheel width direction Y of the main body 13.

In the vehicle wheel 100, the main body 13 is formed of the lower plate 25b which is disposed along the outer circumferential surface of the well portion 11c, and the upper plate 25a which is curved to have a bulge above the lower plate 25b to form the additional air chamber SC. Moreover, the communication hole 20 is formed to be separated from the additional air chamber SC in the wheel width direction Y by the connecting portion 35 at which the upper plate 25 and the lower plate 25b are joined to be partially integral with each other.

The vehicle wheel 100 thus configured makes it possible to form the additional air chamber SC and the communication hole 20 communicated with the additional air chamber SC with a simple configuration, as compared to a vehicle wheel in which the tube member 18 separately prepared is joined to the main body 13 to provide the communication hole 20 communicated with the additional air chamber SC.

In the vehicle wheel 100, the connecting portion 35 is formed of a bent plate member.

The vehicle wheel 100 thus configured allows stiffness of the connecting portion 35 to be heightened, and therefore makes it possible to more effectively prevent deformation of the additional air chamber member 10 encountered when centrifugal force acts thereon.

In the vehicle wheel 100, the additional air chamber member 10 includes two Helmholtz resonators which are integrally formed with each other with the partition wall W as the boundary in the wheel circumferential direction X. Moreover, the communication hole 20 is formed inside the tube member 18 which is formed at both end portions in the wheel circumferential direction X of the additional air chamber member 10, respectively.

The vehicle wheel 100 thus configured allows two Helmholtz resonators to be formed with one additional air chamber member 10, and therefore makes it possible to simplify the configuration of the vehicle wheel 100 in itself. Moreover, the vehicle wheel 100 allows two Helmholtz resonators to be formed with one additional air chamber member 10, and therefore makes it possible to decrease a shaping process for removing burr 117 remaining on the edge portion 14a, 14b, as compared to a vehicle wheel in which two Helmholtz resonators are formed with two additional air chamber members 10.

Figure 10A:
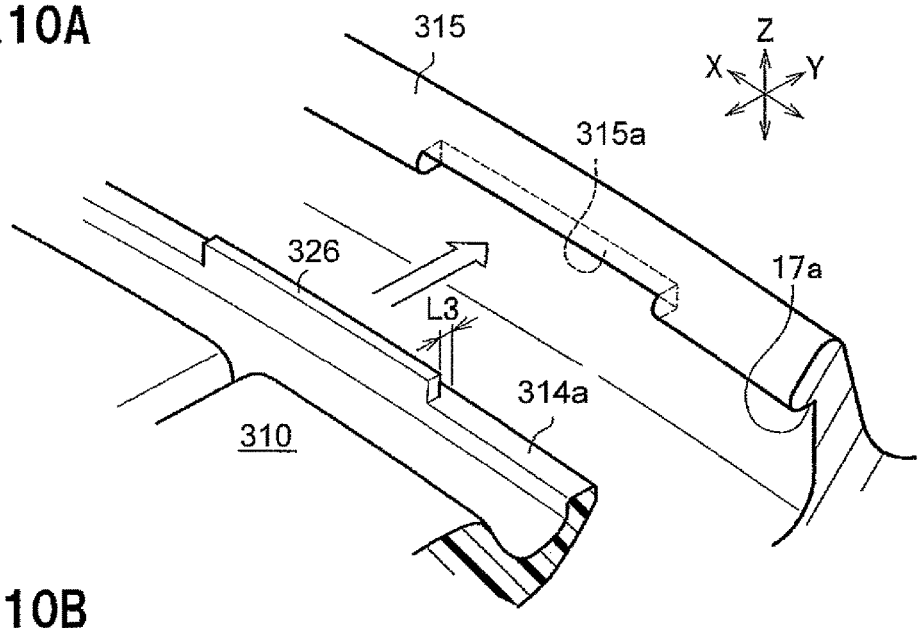
FIG. 10A is a partially enlarged perspective view showing the vicinity of a protruding portion of the additional air chamber member in the vehicle wheel according to another embodiment and the vicinity of a cut-out portion formed in a vertical wall of the well portion.
Figure 10B:
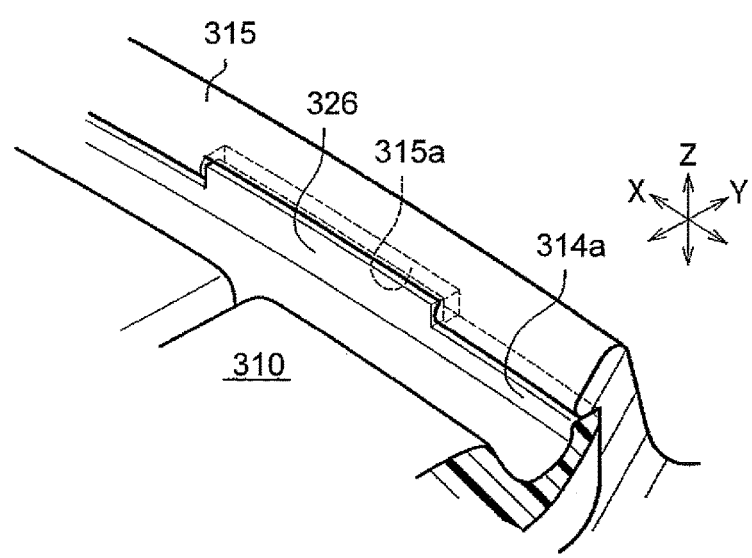
FIG. 10B is a partially enlarged perspective view showing the protruding portion fitted in the cut-out portion.
Figure 10C:
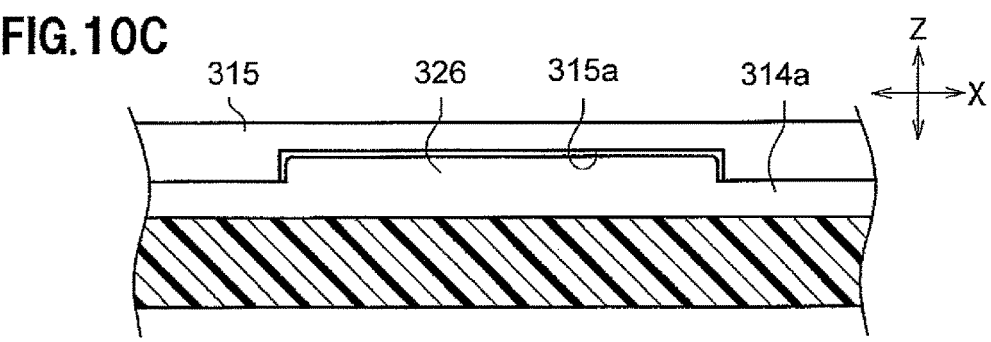
FIG. 10C is a front view showing the protruding portion fitted in the cut-out portion.

Although the present embodiment has been described above, the present invention is not limited to the above embodiment and can be put into practice in various forms. Although in the above embodiment, the outer end portion of the protruding portion 26 is located at the same position as the outer end portion of the edge portion 14a on which the protruding portion 26 is formed, the present invention can also adopt a configuration in which the protruding portion 26 is located on the inner side relative to the edge portion 314a as shown in FIGS. 10A to 10C described below. FIG. 10A is a partially enlarged perspective view showing the vicinity of the protruding portion 326 of the additional air chamber member 310 in the vehicle wheel 300 according to another embodiment of the present invention and the vicinity of the cut-out portion 315a formed in the vertical wall 315 of the well portion 11c, FIG. 10B is a partially enlarged perspective view showing the protruding portion 326 fitted in the cut-out portion 315a, and FIG. 10C is a front view showing the protruding portion 326 fitted in the cut-out portion 315a. As shown in FIG. 10A, the additional air chamber member 310 allows the outer end portion in the wheel width direction Y of the protruding portion 326 to be located on the inner side in the wheel width direction Y relative to the outer end portion in the wheel width direction Y of the edge portion 14a on which the protruding portion 326 is formed. More specifically, the end portion of the protruding portion 326 is located inside by a length L3 relative to the end portion of the edge portion 14a.

Even the additional air chamber member 310 thus configured makes it possible, in the same manner as in the above embodiment, to carry out the shaping process for the edge portion 314a without interference of the protruding portion 326 serving as a rotation-stop formed on the edge portion 314a.

Also, although in the above embodiment, the cut-out portion 15a (see FIG. 7A) is formed to penetrate through the vertical wall 15 (see FIG. 7A) in the width direction Y (see FIG. 7A) of the wheel, the present invention can also adopt a configuration in which the cut-out portion 315a is provided on the vertical wall 315 only with a shape corresponding to the protruding portion 326 as shown in FIG. 10B. Since the cut-out portion 315a thus provided does not penetrate through the vertical wall 315, it can realize a state in which the protruding portion 326 is fitted in the cut-out portion 315a as shown in FIGS. 10B and 10C, which exhibits an excellent design.

Note that, although the cut-out portion 315a herein is provided on the vertical wall 315 with the shape corresponding to the protruding portion 326 (see FIG. 10A) located inside by the length L3 as described above, the present invention can also adopt a configuration in which the cut-out portion 15a is provided on the vertical wall 15 only with a shape corresponding to the protruding portion 26 (see FIG. 6) having the outer end portion at the same position as the outer end portion of the edge portion 14a.

Also, although in the above embodiment, the configuration is adopted in which the protruding portion 26 or 326 is provided on the edge portion 14a or 314a with a longer length, the present invention can also adopt a configuration in which the protruding portion 26 or 326 configured to be fixedly engaged with the cut-out portion 15a or 315a is provided on the edge portion 14b with a shorter length, or on both of the edge portions 14a or 314a, 14b.

Moreover, although in the above embodiment, the configuration is adopted in which the protruding portion 26 or 326 is allowed to protrude outward in the wheel radial direction Z, the present invention can also adopt a configuration in which the protruding portion 26 or 326 is allowed to protrude inward in the wheel radial direction Z. In this configuration, the cut-out portion 15a or 315a is provided to pass through the vertical wall 15 or 315, or provided on the vertical wall 15 or 315 with a shape corresponding to the protruding portion 26 or 326.

Figure 11A:
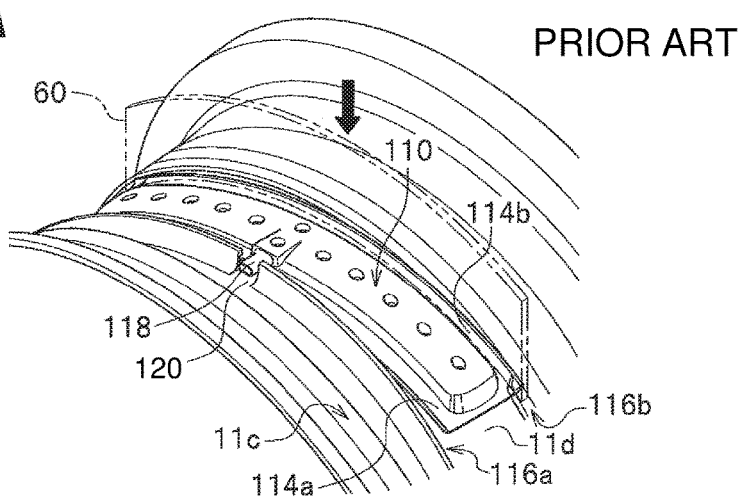
FIG. 11A is a perspective view for explaining a mounting method by which an additional air chamber member in a conventional vehicle wheel is mounted on a well portion.
Figure 11B:
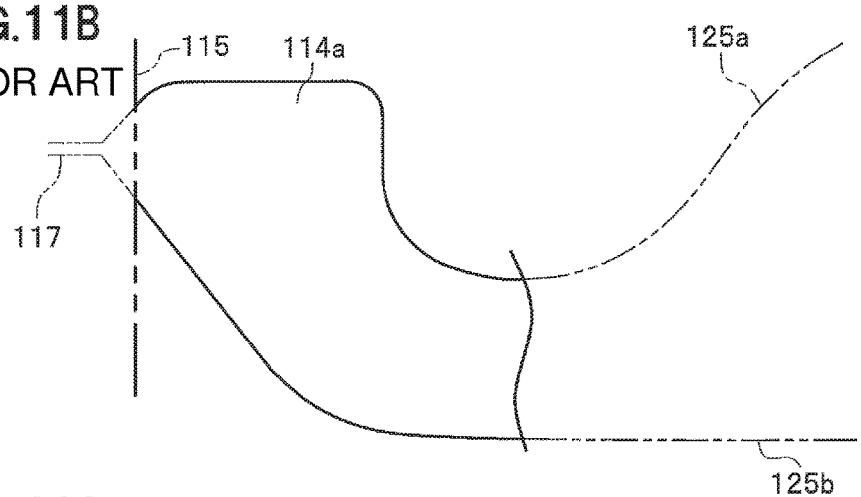
FIG. 11B is a schematic view showing a leading end of an edge portion which has been shaped.
Figure 11C:
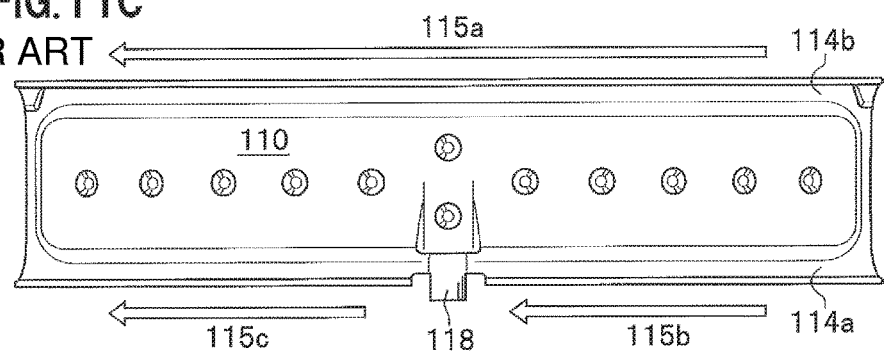
FIG. 11C is an explanatory view of a shaping process for the edge portion of the conventional additional air chamber member.

In addition, although in the above embodiment, the additional air chamber member 10 has the configuration in which two Helmholtz resonators 19a, 19b are integrally formed with each other, the additional air chamber member 10 included in the vehicle wheel 100 according to the present invention may be formed to include only one Helmholtz resonator, as in the additional air chamber member 110 of the conventional vehicle wheel shown in FIGS. 11A and 11C.

REFERENCE SIGNS LIST

10 Additional air chamber member
10a First additional air chamber member
10b Second additional air chamber member
11c Well portion
11d Outer circumferential surface
13 Main body
13a Full-width portion
13b Expanding portion
14a Edge portion (First edge portion)
14b Edge portion (Second edge portion)
15 Vertical wall
15a Cut-out portion
16a First vertical wall surface
16b Second vertical wall surface
17a Groove
17b Groove
18 Tube member
19a Helmholtz resonator
19b Helmholtz resonator
19c Helmholtz resonator
19d Helmholtz resonator
20 Communication hole
20a Communication hole 20b Communication hole
20c Communication hole
20d Communication hole
21 Tire
21a Bead portion (Tire bead portion)
25a Upper plate
25b Lower plate
26 Protruding portion
35 Connecting portion
60 Pusher
100 Vehicle wheel (Wheel for vehicle)
MC Tire air chamber
SC Additional air chamber
X Wheel circumferential direction
Y Wheel width direction
W Partition wall
Z Wheel radial direction

The invention claimed is:

1. A wheel for a vehicle including at least one additional air chamber member on an outer circumferential surface of a well portion, the additional air chamber member serving as a Helmholtz resonator in a tire air chamber, the wheel for a vehicle comprising:
 a first vertical wall surface which is formed to extend in a circumferential direction of the outer circumferential surface on a vertical wall vertically provided on the outer circumferential surface of the well portion;
 a second vertical wall surface which is formed to extend in the circumferential direction on a rising portion formed at one end of the well portion and faces the first vertical wall surface in a width direction of the outer circumferential surface; and
 a groove which is formed to extend in the circumferential direction on the first vertical wall surface and the second vertical wall surface, respectively,
 wherein the additional air chamber member comprises:
  a main body made of resin which is fitted between the first vertical wall surface and the second vertical wall surface and composed of an additional air chamber and a communication hole communicating the additional air chamber with the tire air chamber;
  a first edge portion which is formed to extend from the main body toward the first vertical wall surface and to extend in the circumferential direction, so as to be fixedly engaged with the groove on the first vertical wall surface;
  a second edge portion which is formed to extend from the main body toward the second vertical wall surface and to extend in the circumferential direction, so as to be fixedly engaged with the groove on the second vertical wall surface; and
  a protruding portion which, on the first edge portion and the second edge portion, protrudes from the edge portion in a wheel radial direction to be fixedly engaged with an adjacent one of the first and second vertical wall surfaces, so as to restrict movement of the additional air chamber member to the circumferential direction,
 and wherein an outer end portion in a width direction of the protruding portion is located at the same position as an outer end portion in a width direction of the edge portion on which the protruding portion is formed, or located on an inner side in the width direction relative to the outer end portion in the width direction of the edge portion.

2. The wheel for a vehicle according to claim 1, wherein a pair of additional air chamber members are disposed to face each other across a wheel rotation center.

3. The wheel for a vehicle according to claim 1, wherein the communication hole is formed inside a tube member which is disposed near one side edge in a wheel width direction of the additional air chamber member, and the tube member is provided at an end portion in a wheel circumferential direction of the additional air chamber member to extend along the wheel circumferential direction.

4. The wheel for a vehicle according to claim 1, wherein the main body is formed of a lower plate which is disposed along the outer circumferential surface of the well portion, and an upper plate which is curved to have a bulge above the lower plate to form the additional air chamber, and the communication hole is formed to be separated from the additional air chamber in a wheel width direction by a connecting portion at which the upper plate and the lower plate are joined to be partially integral with each other.

5. The wheel for a vehicle according to claim 4, wherein the connecting portion is formed of a bent plate member.

6. The wheel for a vehicle according to claim 1, wherein the additional air chamber member includes two Helmholtz resonators which are integrally formed with each other with a partition wall as a boundary in a wheel circumferential direction, and the communication hole is formed inside a tube member which is formed at both end portions in the wheel circumferential direction of the additional air chamber member, respectively.

* * * * *